(12) United States Patent
Barriac

(10) Patent No.: US 8,411,621 B2
(45) Date of Patent: Apr. 2, 2013

(54) METHOD AND APPARATUS OF PROCESSING NON-STICKY ASSIGNMENTS IN WIRELESS COMMUNICATION SYSTEMS

(75) Inventor: Gwendolyn D. Barriac, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 720 days.

(21) Appl. No.: 12/091,477

(22) PCT Filed: Oct. 27, 2006

(86) PCT No.: PCT/US2006/041908
§ 371 (c)(1),
(2), (4) Date: Oct. 8, 2008

(87) PCT Pub. No.: WO2007/050828
PCT Pub. Date: May 3, 2007

(65) Prior Publication Data
US 2009/0219887 A1 Sep. 3, 2009

Related U.S. Application Data

(60) Provisional application No. 60/731,037, filed on Oct. 27, 2005.

(51) Int. Cl.
*H04W 4/00* (2009.01)

(52) U.S. Cl. ........................................ 370/329; 370/331

(58) Field of Classification Search .................. 370/331, 370/329
See application file for complete search history.

(56) References Cited

U.S. PATENT DOCUMENTS

2005/0165949 A1 * 7/2005 Teague .......................... 709/236

FOREIGN PATENT DOCUMENTS

| JP | 2003-500891 | 1/2003 |
|---|---|---|
| WO | 2005067181 | 7/2005 |
| WO | 2005074184 | 8/2005 |

OTHER PUBLICATIONS

Office Action mailed Feb. 26, 2010 for Korean Patent Application No. 2008-7012604, 4 pages.
International Search Report mailed Mar. 6, 2007 for PCT Application No. PCT/US2006/041908, 2 pages.
English Translation of Korean Office Action mailed Aug. 31, 2010 for Korean Patent Application No. 2008-7012604, 4 pages.
English Translation of Japanese Office Action mailed Feb. 22, 2011 for Japanese Patent Application No. 22008-537965.

* cited by examiner

*Primary Examiner* — Sai-Ming Chan
(74) *Attorney, Agent, or Firm* — Fulbright & Jaworski L.L.P.

(57) ABSTRACT

A method and apparatus for management of Non-Sticky Assignments in a wireless communication system comprising receiving Non-Sticky Forward Link Assignment blocks with a matching broadcast or unicast MACID, determining a value of FLImplicitDeassignEnabled field and determining a TunedAway indication.

28 Claims, 8 Drawing Sheets

METHOD AND APPARATUS OF PROCESSING NON-STICKY ASSIGNMENTS IN WIRELESS COMMUNICATION SYSTEMS

CLAIM OF PRIORITY UNDER 35 U.S.C. §119

The present Application for Patent claims priority to Provisional Application Ser. No. 60/731,037, entitled "METHODS AND APPARATUS FOR PROVIDING MOBILE BROADBAND WIRELESS HIGHER MAC", filed Oct. 27, 2005, assigned to the assignee hereof, and expressly incorporated herein by reference.

BACKGROUND

1. Field

The present disclosure relates generally to wireless communications and more particularly to methods and apparatus to process non-sticky assignments by access terminal.

2. Background

Wireless communication systems have become a prevalent means by which a majority of people worldwide have come to communicate. Wireless communication devices have become smaller and more powerful in order to meet consumer needs and to improve portability and convenience. The increase in processing power in mobile devices such as cellular telephones has lead to an increase in demands on wireless network transmission systems. Such systems typically are not as easily updated as the cellular devices that communicate there over. As mobile device capabilities expand, it can be difficult to maintain an older wireless network system in a manner that facilitates fully exploiting new and improved wireless device capabilities.

Wireless communication systems generally utilize different approaches to generate transmission resources in the form of channels. These systems may be code division multiplexing (CDM) systems, frequency division multiplexing (FDM) systems, and time division multiplexing (TDM) systems. One commonly utilized variant of FDM is orthogonal frequency division multiplexing (OFDM) that effectively partitions the overall system bandwidth into multiple orthogonal subcarriers. These subcarriers may also be referred to as tones, bins, and frequency channels. Each subcarrier can be modulated with data. With time division based techniques, a each sub-carrier can comprise a portion of sequential time slices or time slots. Each user may be provided with a one or more time slot and subcarrier combinations for transmitting and receiving information in a defined burst period or frame. The hopping schemes may generally be a symbol rate hopping scheme or a block hopping scheme.

Code division based techniques typically transmit data over a number of frequencies available at any time in a range. In general, data is digitized and spread over available bandwidth, wherein multiple users can be overlaid on the channel and respective users can be assigned a unique sequence code. Users can transmit in the same wide-band chunk of spectrum, wherein each user's signal is spread over the entire bandwidth by its respective unique spreading code. This technique can provide for sharing, wherein one or more users can concurrently transmit and receive. Such sharing can be achieved through spread spectrum digital modulation, wherein a user's stream of bits is encoded and spread across a very wide channel in a pseudo-random fashion. The receiver is designed to recognize the associated unique sequence code and undo the randomization in order to collect the bits for a particular user in a coherent manner.

A typical wireless communication network (e.g., employing frequency, time, and/or code division techniques) includes one or more base stations that provide a coverage area and one or more mobile (e.g., wireless) terminals that can transmit and receive data within the coverage area. A typical base station can simultaneously transmit multiple data streams for broadcast, multicast, and/or unicast services, wherein a data stream is a stream of data that can be of independent reception interest to a mobile terminal. A mobile terminal within the coverage area of that base station can be interested in receiving one, more than one or all the data streams transmitted from the base station. Likewise, a mobile terminal can transmit data to the base station or another mobile terminal. In these systems the bandwidth and other system resources are assigned utilizing a scheduler.

The signals, signal formats, signal exchanges, methods, processes, and techniques disclosed herein provide several advantages over known approaches. These include, for example, reduced signaling overhead, improved system throughput, increased signaling flexibility, reduced information processing, reduced transmission bandwidth, reduced bit processing, increased robustness, improved efficiency, and reduced transmission power.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

According to one embodiment, a method of management of Non-Sticky Assignments in a wireless communication system is provided comprising receiving Non-Sticky Forward Link Assignment block with matching broadcast or unicast MACID, determining a value of FLImplicitDeassignEnabled field and determining TunedAway indication.

According to another embodiment, a computer-readable medium including instructions stored thereon is provided comprising a first set of instructions for Non-Sticky Forward Link Assignment Blocks (NS-FLABs) with matching broadcast or unicast MACID, a second set of instructions for determining a value of FLImplicitDeassignEnabled field and a third set of instructions for determining TunedAway indication.

According to yet another embodiment, an apparatus operable in a wireless communication system is provided comprising means for receiving Non-Sticky Forward Link Assignment Blocks (NS-FLABs) with matching broadcast or unicast MACID means for determining value of a FLImplicitDeassignEnabled field and means for determining TunedAway indication.

To the accomplishment of the foregoing and related ends, the one or more aspects comprise the features hereinafter fully described and particularly pointed out in the claims. The following description and the annexed drawings set forth in detail certain illustrative aspects of the one or more aspects. These aspects are indicative, however, of but a few of the various ways in which the principles of various aspects may be employed and the described aspects are intended to include all such aspects and their equivalents.

DETAILED DESCRIPTION

Figure 1:
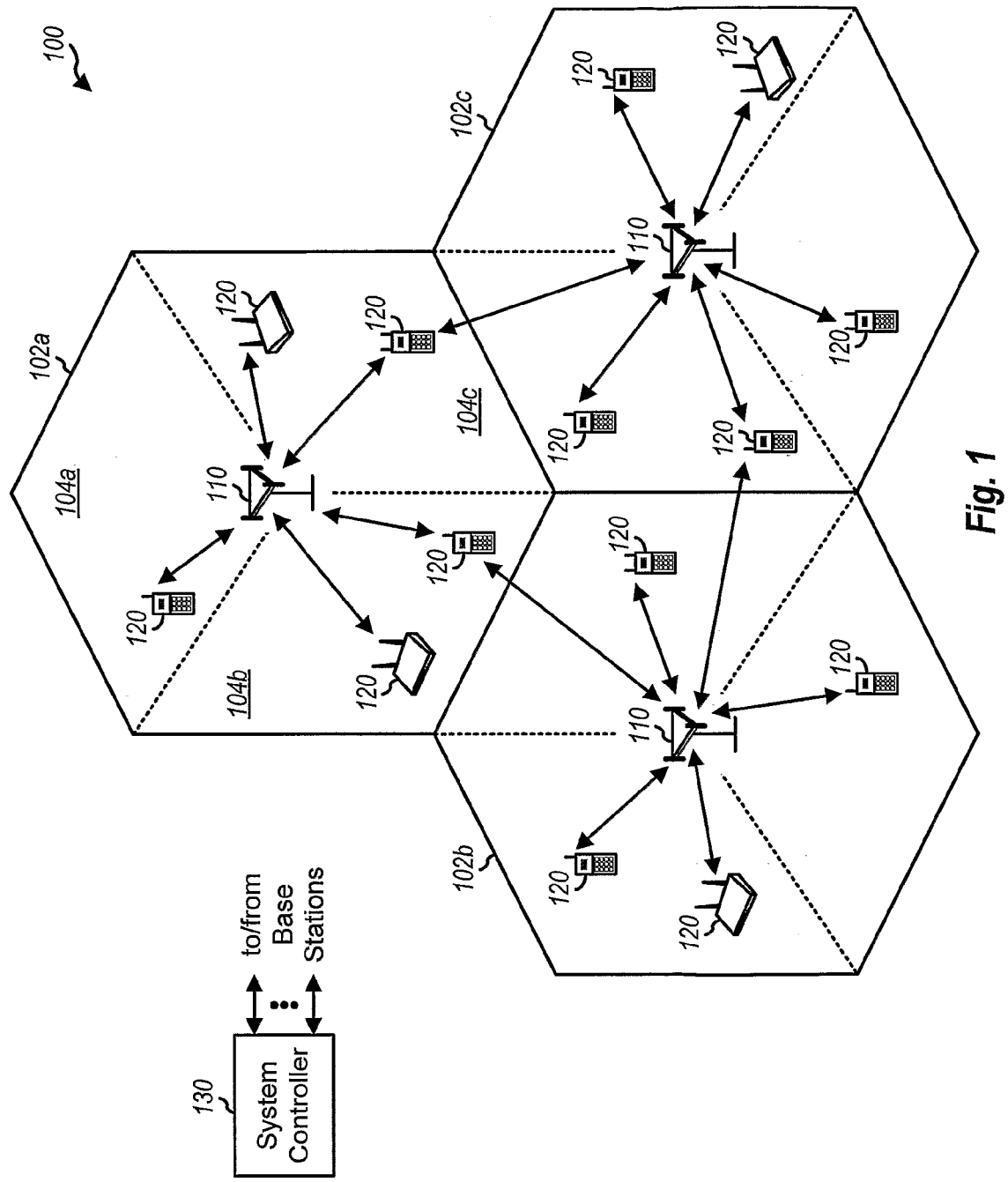
FIG. 1 illustrates embodiments of a multiple access wireless communication system.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiment(s) may be practiced without these specific details. In other instances, well-known structures and devices are shown in block diagram form in order to facilitate describing one or more embodiments.

Referring to FIG. 1, a multiple access wireless communication system according to one embodiment is illustrated. A multiple access wireless communication system 100 includes multiple cells, e.g. cells 102, 104, and 106. In the embodiment of FIG. 1, each cell 102, 104, and 106 may include an access point 150 that includes multiple sectors. The multiple sectors are formed by groups of antennas each responsible for communication with access terminals in a portion of the cell. In cell 102, antenna groups 112, 114, and 116 each correspond to a different sector. In cell 104, antenna groups 118, 120, and 122 each correspond to a different sector. In cell 106, antenna groups 124, 126, and 128 each correspond to a different sector.

Each cell includes several access terminals which are in communication with one or more sectors of each access point. For example, access terminals 130 and 132 are in communication base 142, access terminals 134 and 136 are in communication with access point 144, and access terminals 138 and 140 are in communication with access point 146.

Controller 130 is coupled to each of the cells 102, 104, and 106. Controller 130 may contain one or more connections to multiple networks, e.g. the Internet, other packet based networks, or circuit switched voice networks that provide information to, and from, the access terminals in communication with the cells of the multiple access wireless communication system 100. The controller 130 includes, or is coupled with, a scheduler that schedules transmission from and to access terminals. In other embodiments, the scheduler may reside in each individual cell, each sector of a cell, or a combination thereof.

As used herein, an access point may be a fixed station used for communicating with the terminals and may also be referred to as, and include some or all the functionality of, a base station, a Node B, or some other terminology. An access terminal may also be referred to as, and include some or all the functionality of, a user equipment (UE), a wireless communication device, terminal, a mobile station or some other terminology.

It should be noted that while FIG. 1, depicts physical sectors, i.e. having different antenna groups for different sectors, other approaches may be utilized. For example, utilizing multiple fixed "beams" that each cover different areas of the cell in frequency space may be utilized in lieu of, or in combination with physical sectors. Such an approach is depicted and disclosed in copending U.S. patent application Ser. No. 11/260,895, entitled "Adaptive Sectorization In Cellular System."

Figure 2:
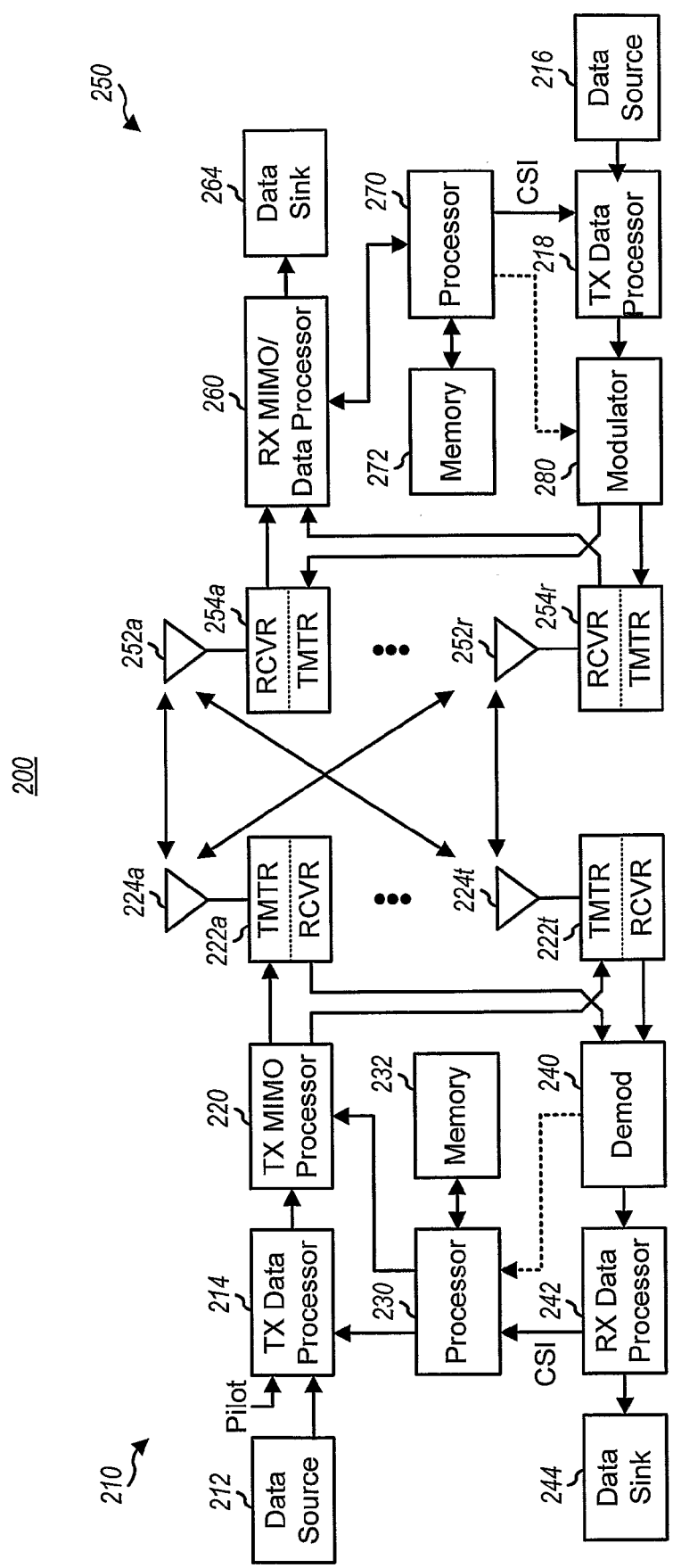
FIG. 2 illustrates embodiments of a transmitter and receiver in a multiple access wireless communication system.

Referring to FIG. 2, a block diagram of an embodiment of a transmitter system 210 and a receiver system 250 in a MIMO system 200 is illustrated. At transmitter system 210, traffic data for a number of data streams is provided from a data source 212 to transmit (TX) data processor 214. In an embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM, or other orthogonalization or non-orthogonalization techniques. The pilot data is typically a known data pattern that is processed in a known manner and may be used at the receiver system to estimate the channel response. The multiplexed pilot and coded data for each data stream is then modulated (i.e., symbol mapped) based on one or more particular modulation schemes (e.g., BPSK, QSPK, M-PSK, or M-QAM) selected for that data stream to provide modulation symbols. The data rate, coding, and modulation for each data stream may be determined by instructions performed on provided by processor 230.

The modulation symbols for all data streams are then provided to a TX processor 220, which may further process the modulation symbols (e.g., for OFDM). TX processor 220 then provides $N_T$ modulation symbol streams to $N_T$ transmitters (TMTR) 222a through 222t. Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The processing by RX data processor 260 is described in further detail below. Each detected symbol stream includes symbols that are estimates of the modulation symbols transmitted for the corresponding data stream. RX data processor 260 then demodulates, deinterleaves, and decodes each detected symbol stream to recover the traffic data for the data stream. The processing by RX data processor 218 is complementary to that performed by TX processor 220 and TX data processor 214 at transmitter system 210.

RX data processor 260 may be limited in the number of subcarriers that it may simultaneously demodulate, e.g. 512 subcarriers or 5 MHz, and such a receiver should be scheduled on a single carrier. This limitation may be a function of its FFT range, e.g. sample rates at which the processor 260 may operate, the memory available for FFT, or other functions available for demodulation. Further, the greater the number of subcarriers utilized, the greater the expense of the access terminal.

The channel response estimate generated by RX processor 260 may be used to perform space, space/time processing at the receiver, adjust power levels, change modulation rates or schemes, or other actions. RX processor 260 may further estimate the signal-to-noise-and-interference ratios (SNRs) of the detected symbol streams, and possibly other channel characteristics, and provides these quantities to a processor 270. RX data processor 260 or processor 270 may further derive an estimate of the "operating" SNR for the system. Processor 270 then provides channel state information (CSI), which may comprise various types of information regarding the communication link and/or the received data stream. For example, the CSI may comprise only the operating SNR. In other embodiments, the CSI may comprise a channel quality indicator (CQI), which may be a numerical value indicative of one or more channel conditions. The CSI is then processed by a TX data processor 278, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to recover the CSI reported by the receiver system. The reported CSI is then provided to processor 230 and used to (1) determine the data rates and coding and modulation schemes to be used for the data streams and (2) generate various controls for TX data processor 214 and TX processor 220. Alternatively, the CSI may be utilized by processor 270 to determine modulation schemes and/or coding rates for transmission, along with other information. This may then be provided to the transmitter which uses this information, which may be quantized, to provide later transmissions to the receiver.

Processors 230 and 270 direct the operation at the transmitter and receiver systems, respectively. Memories 232 and 272 provide storage for program codes and data used by processors 230 and 270, respectively.

At the receiver, various processing techniques may be used to process the $N_R$ received signals to detect the $N_T$ transmitted symbol streams. These receiver processing techniques may be grouped into two primary categories (i) spatial and space-time receiver processing techniques (which are also referred to as equalization techniques); and (ii) "successive nulling/equalization and interference cancellation" receiver processing technique (which is also referred to as "successive interference cancellation" or "successive cancellation" receiver processing technique).

While FIG. 2 discusses a MIMO system, the same system may be applied to a multi-input single-output system where multiple transmit antennas, e.g. those on a base station, transmit one or more symbol streams to a single antenna device, e.g. a mobile station. Also, a single output to single input antenna system may be utilized in the same manner as described with respect to FIG. 2.

The transmission techniques described herein may be implemented by various means. For example, these techniques may be implemented in hardware, firmware, software, or a combination thereof. For a hardware implementation, the processing units at a transmitter may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof. The processing units at a receiver may also be implemented within one or more ASICs, DSPs, processors, and so on.

For a software implementation, the transmission techniques may be implemented with processors (e.g., procedures, functions, and so on) that perform the functions described herein. The software codes may be stored in a memory (e.g., memory 230, 272x or 272y in FIG. 2) and executed by a processor (e.g., processor 232, 270x or 270y). The memory may be implemented within the processor or external to the processor.

It should be noted that the concept of channels herein refers to information or transmission types that may be transmitted by the access point or access terminal. It does not require or utilize fixed or predetermined blocks of subcarriers, time periods, or other resources dedicated to such transmissions.

Figure 3A:
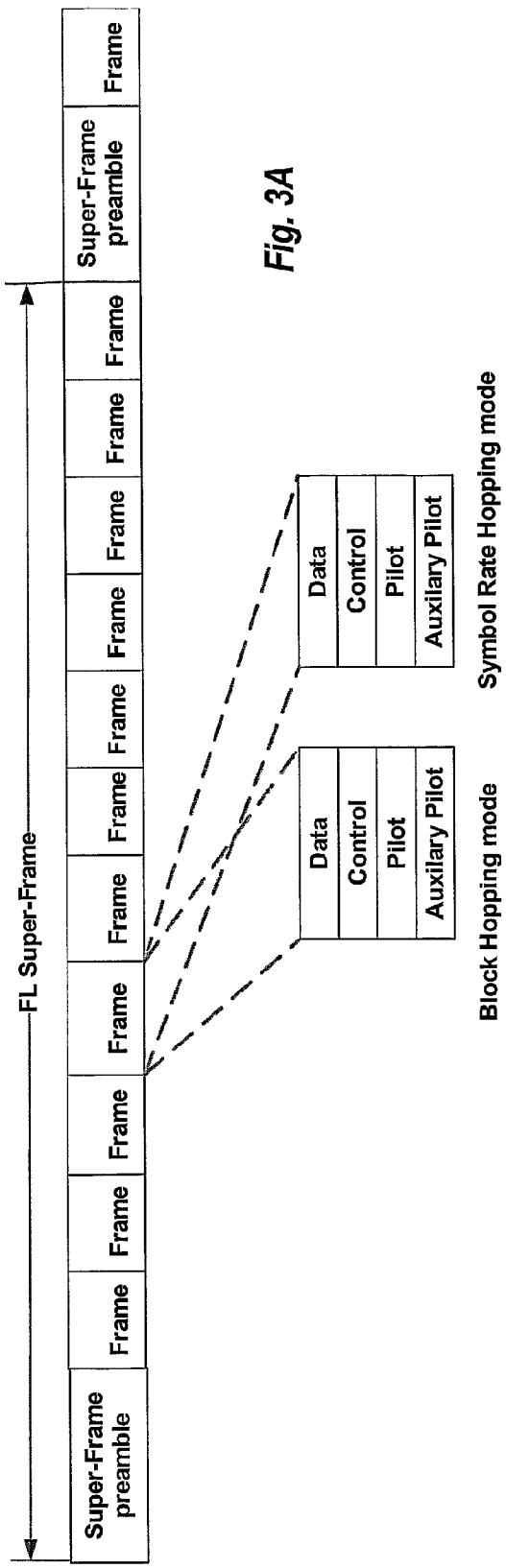
FIGS. 3A and 3B illustrate embodiments of superframe structures for a multiple access wireless communication system.
Figure 3B:
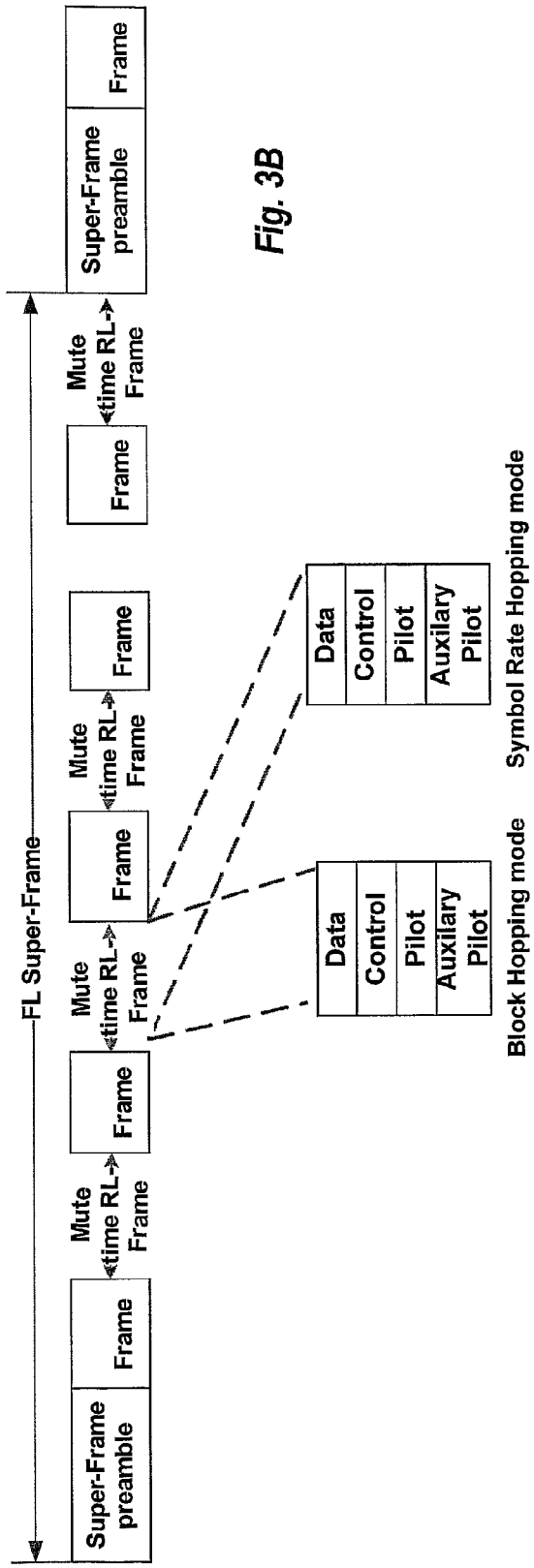

Referring to FIGS. 3A and 3B, embodiments of superframe structures for a multiple access wireless communication system are illustrated. FIG. 3A illustrates embodiments of superframe structures for a frequency division duplexed (FDD) multiple access wireless communication system, while FIG. 3B illustrates embodiments of superframe structures for a time division duplexed (TDD) multiple access wireless communication system. The superframe preamble may be transmitted separately for each carrier or may span all of the carriers of the sector.

In both FIGS. 3A and 3B, the forward link transmission is divided into units of superframes. A superframe may consist of a superframe preamble followed by a series of frames. In an FDD system, the reverse link and the forward link transmission may occupy different frequency bandwidths so that transmissions on the links do not, or for the most part do not, overlap on any frequency subcarriers. In a TDD system, N forward link frames and M reverse link frames define the number of sequential forward link and reverse link frames that may be continuously transmitted prior to allowing transmission of the opposite type of frame. It should be noted that the number of N and M may be vary within a given superframe or between superframes.

In both FDD and TDD systems each superframe may comprise a superframe preamble. In certain embodiments, the superframe preamble includes a pilot channel that includes pilots that may be used for channel estimation by access terminals, a broadcast channel that includes configuration information that the access terminal may utilize to demodulate the information contained in the forward link frame. Further acquisition information such as timing and other information sufficient for an access terminal to communicate on one of the carriers and basic power control or offset information may also be included in the superframe preamble. In other cases, only some of the above and/or other information may be included in this superframe preamble.

As shown in FIGS. 3A and 3B, the superframe preamble is followed by a sequence of frames. Each frame may consist of a same or a different number of OFDM symbols, which may constitute a number of subcarriers that may simultaneously utilized for transmission over some defined period. Further, each frame may operate according to a symbol rate hopping mode, where one or more non-contiguous OFDM symbols are assigned to a user on a forward link or reverse link, or a block hopping mode, where users hop within a block of OFDM symbols. The actual blocks or OFDM symbols may or may not hop between frames.

Figure 4:
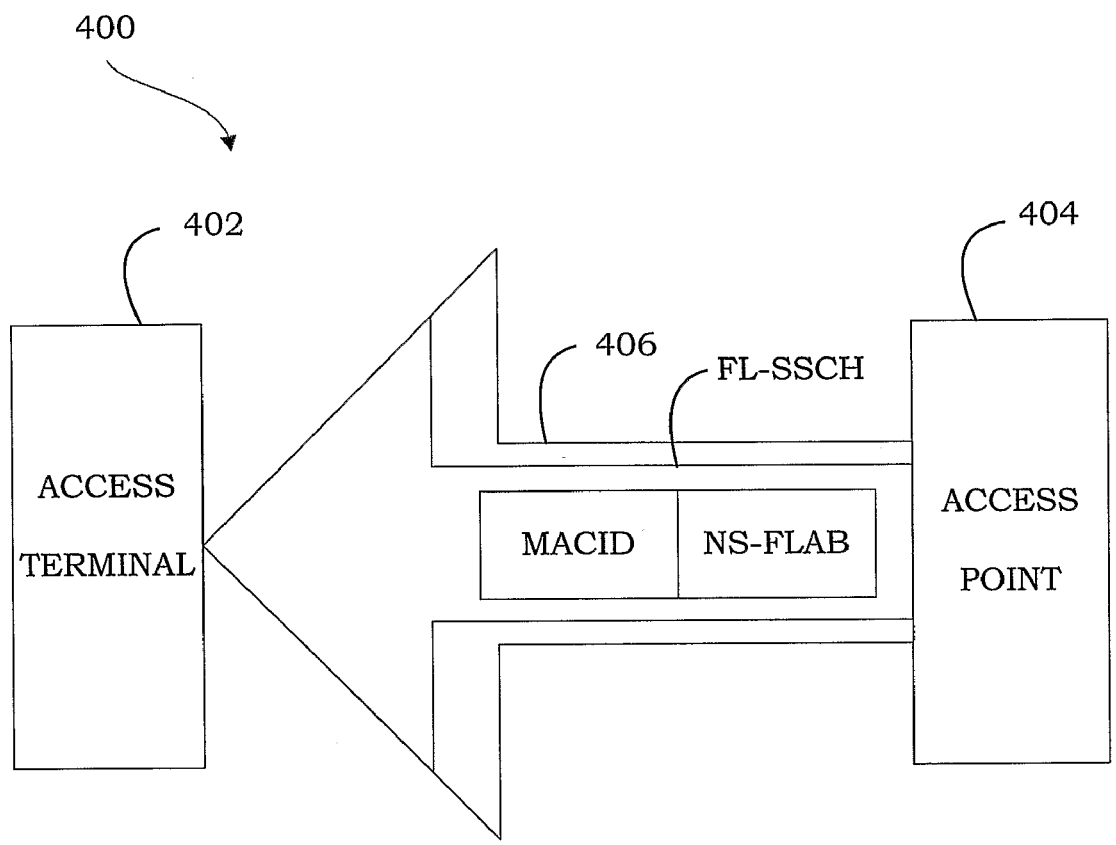
FIG. 4 illustrates embodiment of a communication between an access terminal and access point.

FIG. 4 illustrates communication between an access terminal 402 (for example, the transmitter system 250) and access point 404 according to an embodiment. Using a communication link 406 and based upon predetermined timing, system conditions, or other decision criteria, the access point 404 sends Non-Sticky Forward Link Assignment Blocks (NS-FLABs) through Forward Link Shared Signal (FLSS) to the access terminal for further assigning hop ports. In an embodiment, a NS-FLAB comprises a MACID for broadcast or a MACID for Unicast. If the NS-FLAB is sent through Unicast, the access terminal 402 matches the Unicast MACID with its MACID for further processing of NS-FLAB. The Unicast NS-FLAB may be any type, but broadcast NS-FLABs may not be NS-SCWFLABs OR NS-MCWFLABs. The access terminal 402 may maintain and manage its Forward Link Non-Sticky Assignments by monitoring Forward Link Assignment Blocks and Non-Sticky Assignment Blocks delivered from the access point 404. The communication link 406 may be implemented using communication protocols/standards such as World Interoperability for Microwave Access (WiMAX), infrared protocols such as Infrared Data Association (IrDA), short- range wireless protocols/technologies, Bluetooth® technology, ZigBee® protocol, ultra wide band (UWB) protocol, home radio frequency (HomeRF), shared wireless access protocol (SWAP), wideband technology such as a wireless Ethernet compatibility alliance (WECA), wireless fidelity alliance (Wi-Fi Alliance), 802.11 network technology, public switched telephone network technology, public heterogeneous communications network technology such as the Internet, private wireless communications network, land mobile radio network, code division multiple access (CDMA), wideband code division multiple access (WCDMA), universal mobile telecommunications system (UMTS), advanced mobile phone service (AMPS), time division multiple access (TDMA), frequency division multiple access (FDMA), orthogonal frequency division multiple (OFDM), orthogonal frequency division multiple access (OFDMA), orthogonal frequency division multiple FLASH (OFDM-FLASH), global system for mobile communications (GSM), single carrier (IX) radio transmission technology (RTT), evolution data only (EV-DO) technology, general packet radio service (GPRS), enhanced data GSM environment (EDGE), high speed downlink data packet access (HSPDA), analog and digital satellite systems, and any other technologies/protocols that may be used in at least one of a wireless communications network and a data communications network.

Figure 5A:
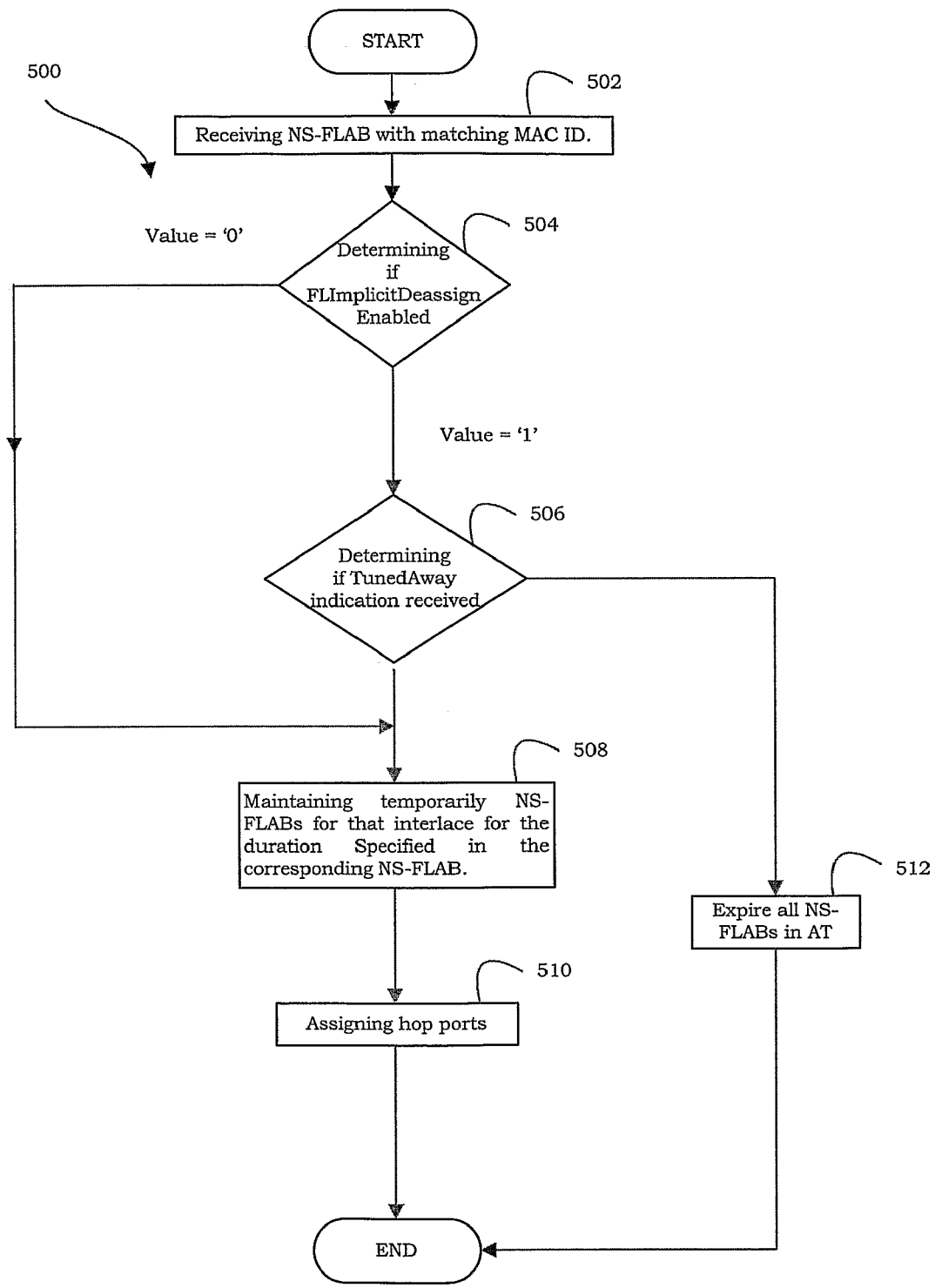
FIG. 5A illustrates a flow diagram of a process used by access terminal.

FIG. 5A illustrates the flow diagram of the process 500 for management of Non-Sticky Assignments. At 502, an access terminal (such as access terminal 402 of FIG. 4) receives Non Sticky Forward Link Assignment Blocks (NS-FLABs) with matching broadcast or unicast MACID. At 504, the access determines FLImplicitDeassignEnabled field. According to an embodiment, if the value of FLImplicitDeassignEnabled field is equal to '1', the access terminal 402 determines if the access terminal has received a TunedAway indication from the Connected State Protocol at 506. According to another embodiment, if the TunedAway indication has been received by the access terminal 402 and the value of FLImplicitDeassignEnabled field is equal to '1', the access terminal 402 expires its Forward Link Non Sticky Assignments at 512. At 508, the access terminal 402 temporarily maintains the Forward Link Non Sticky Assignment Blocks received from access point (such as access point 404 in FIG. 4.) for that interlace. The access terminal may give up its Forward Link Non Sticky Assignments for a particular interlace after it has kept it for the assignment duration specified in the corresponding Forward Link Non Sticky Assignment. The access terminal 402 may receive the Forward Link Non Sticky Assignments with either Broadcast MACIDs or Unicast MACIDs. At 510, the access terminal 402 assigns hop ports. Determining the value of FLImplicitDeassignEnabled field and Tuned Away indication increases the access terminal's efficiency such that one or more of aforementioned embodiments need not occur.

Figure 5B:
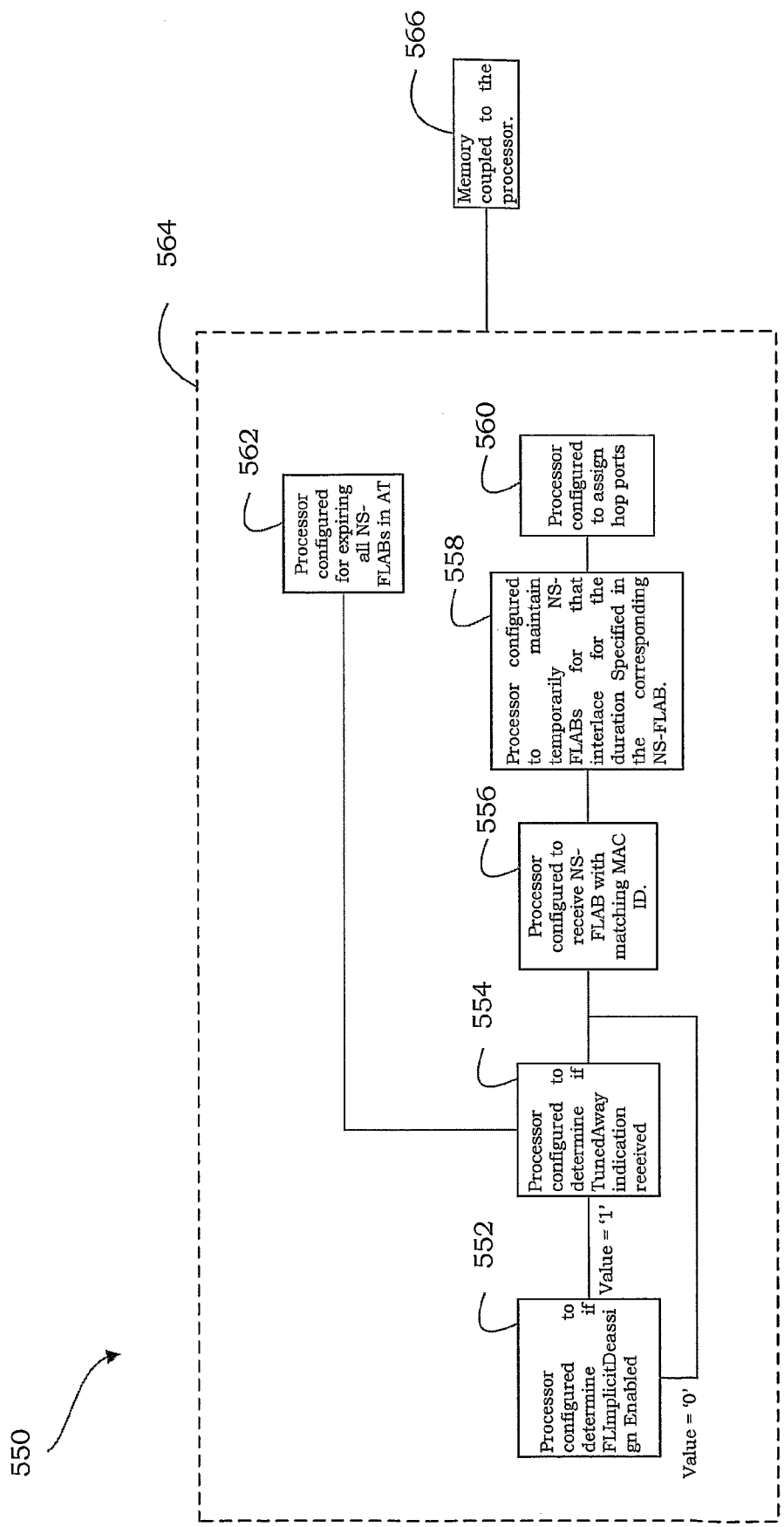
FIG. 5B illustrates one or more processors for the process of management of Non-Sticky Assignments in wireless communication system.

FIG. 5B illustrates use of one or more processors to carry out the methods for management of Non-sticky Forward Link Assignments. The processor referred to may be one or more electronic devices and may comprise one or more processors configured to receive the blocks. A processor 552 is configured to receive Non Sticky Forward Link Assignment Blocks (NS-FLABs) with matching broadcast or unicast MACID. A processor 554 is configured to determine a FLImplicitDeassignEnabled field value. According to an embodiment, if the value of FLImplicitDeassignEnabled field is equal to '1', a processor 556 is configured to determine if the access terminal has received a TunedAway indication from the Connected State Protocol. According to another embodiment, if the TunedAway indication has been received by the access terminal 402 and the value of FLImplicitDeassignEnabled field is equal to '1', a processor 562 is configured to expire its Forward Link Non Sticky Assignments. A processor 558 is configured to temporarily maintain the Forward Link Non Sticky Assignment Blocks received from access point (such as access point 404 in FIG. 4.) for that interlace. The processor at 558 may give up its Forward Link Non Sticky Assignments for a particular interlace after it has kept it for the assignment duration specified in the corresponding Forward Link Non Sticky Assignment. The processor 556 is configured to receive the Forward Link Non Sticky Assignments with either Broadcast MACIDs or Unicast MACIDs. At 560, a processor is configured to assign hop ports. Determining the value of FLImplicitDeassignEnabled field and Tuned Away indication increases processing efficiency such that one or more of aforementioned embodiments need not occur. The functionality of the discrete processors 552 and 562 depicted in the figure may be combined into a single processor 564. A memory 566 is also coupled to the processor 564.

In an embodiment, an apparatus comprises means for receiving Non Sticky Forward Link Assignment Blocks (NS-FLABs) with matching broadcast or unicast MACID and determining a FLImplicitDeassignEnabled field value. An apparatus further comprises means for determining if the access terminal has received a TunedAway indication from the Connected State Protocol. The apparatus further comprises means to expire its Forward Link Non Sticky Assignments if the FLImplicitDeassignEnabled field value is equal to '1' and the TunedAway indication has been received. The apparatus further comprises means for receiving the Non-Sticky Forward Link Assignment block with matching MACID. The apparatus further comprising means for temporarily maintaining the Forward Link Non Sticky Assignment Blocks received from access point (such as access point 404 in FIG. 4.) for that interlace. The apparatus further comprises means for assigning hop ports. The means described herein may comprise one or more processors.

Figure 6A:
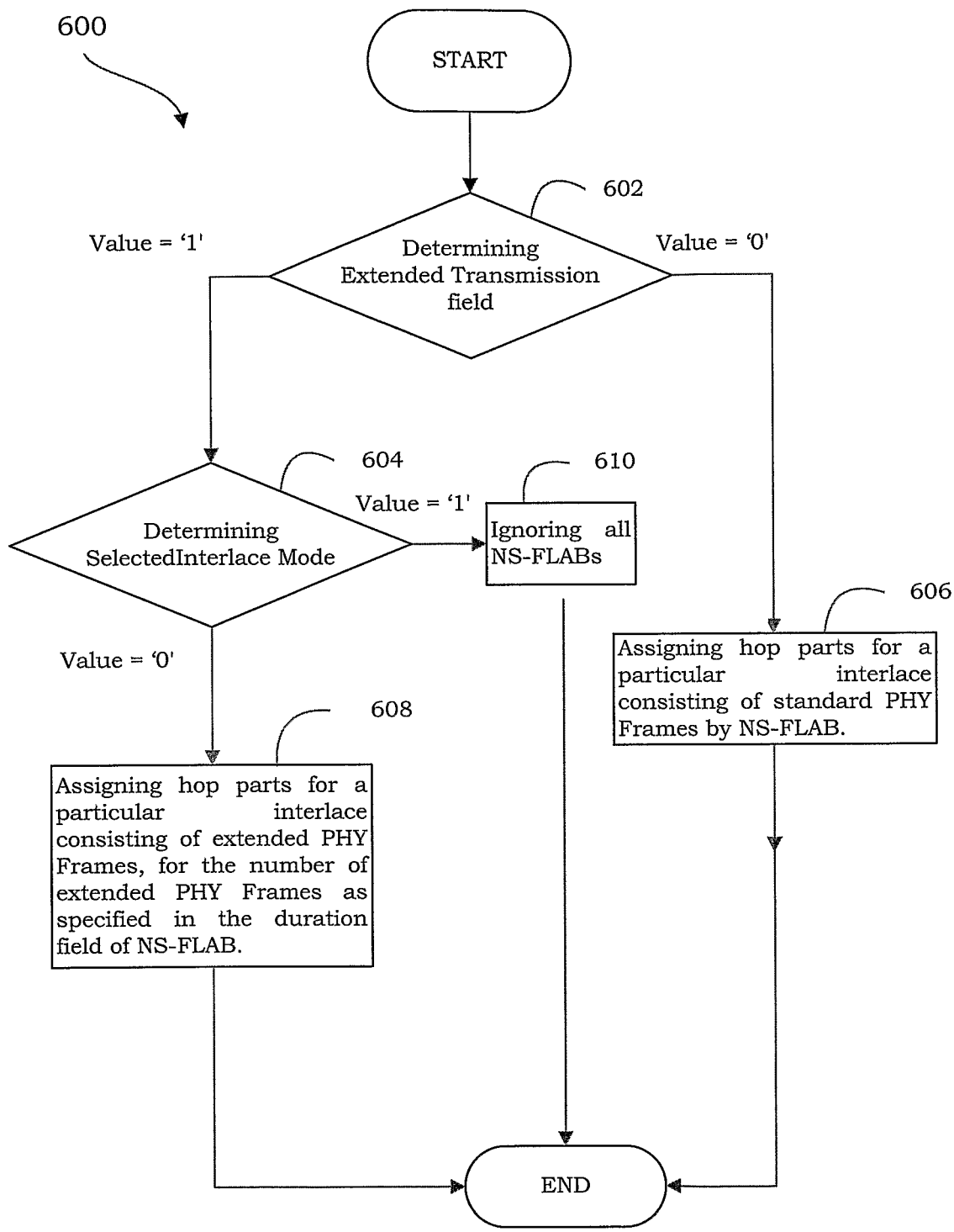
FIG. 6A illustrates a flow diagram of assigning hop ports.

FIG. 6A illustrates a flow diagram for process 600 of assigning hop ports. At 602, the access terminal (such as access terminal 402 in FIG. 4) determines the value of Extended Transmission field. If the value of Extended Transmission field is equal to '0', the access terminal 402 assigns hop ports for a particular interlace consisting of standard PHY Frames by NS-FLABs at 606. If the value of Extended Transmission field is equal to '1', at 604 the access terminal determines the SelectedInterlace Mode. If the SelectedInterlace Mode is '0', the access terminal ignores all NS-FLABs 610. If the SelectedInterlace Mode is '0', the access terminal 402 assigns hop ports for a particular interlace consisting of extended PHY Frames at 608. The number of the extended PHY Frames is specified in the duration field of NS-FLAB.

Figure 6B:
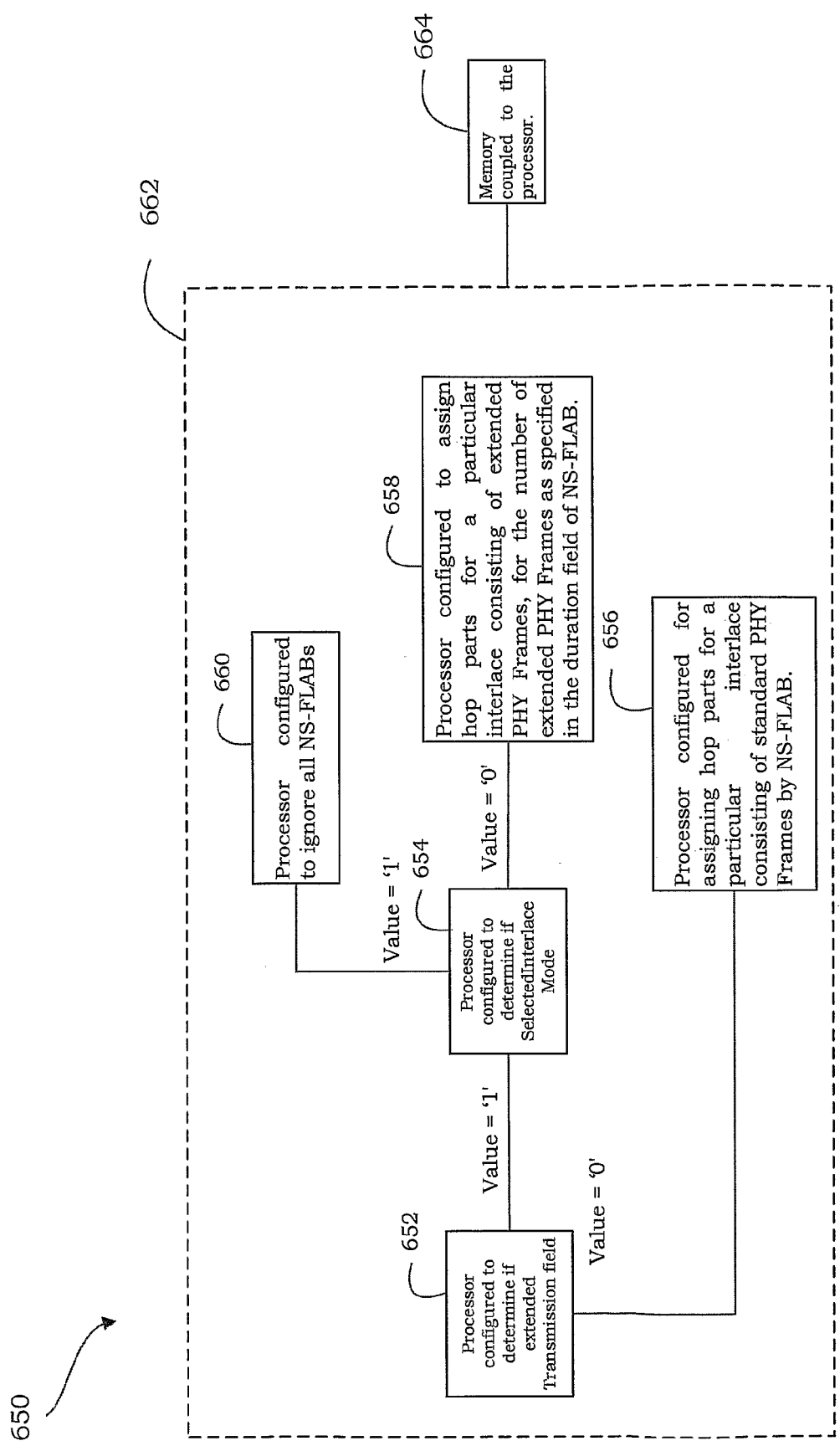
FIG. 6B illustrates one or more processors for assigning hop ports in wireless communication system.

FIG. 6B illustrates a processor 650 for a process of assigning hop ports. The processor referred to may be one or more electronic devices and may comprise one or more processors configured to receive the block. A processor 652 is configured to determine the value of Extended Transmission field. If the value of Extended Transmission field is equal to '0', a processor 656 is configured to assign hop ports for a particular interlace consisting of standard PHY Frames by NS-FLABs. If the value of Extended Transmission field is equal to '1', a processor 654 is configured to determine SelectedInterlace Mode. If SelectedInterlace Mode is '1' a processor 660 is configured to ignore all NS-FLABs. If SelectedInterlace Mode is '0', a processor 658 is configured to assign hop ports for a particular interlace consisting of extended PHY Frames. The functionality of the discrete processors 652 to 658 depicted in the figure may be combined into a single processor 660. A memory 662 is also coupled to the processor 660.

In an embodiment, an apparatus comprises means for determining the value of Extended Transmission field. An apparatus further comprises means for assigning hop ports for a particular interlace consisting of standard PHY Frames by NS-FLABs, if the value of Extended Transmission field is equal to '0'. An apparatus further comprises determining the value of SelectedInterlace Mode. An apparatus further comprises means for ignoring all NS-FLABs, if the value of Extended Transmission field is equal to '1' and the value of SelectedInterlace Mode is equal to '1'. An apparatus further comprises means to assign hop ports for a particular interlace consisting of extended PHY Frames if SelectedInterlace Mode is equal to '0' and Extended Transmission field is equal to '1'. The means described herein may comprise one or more processors.

Furthermore, embodiments may be implemented by hardware, software, firmware, middleware, microcode, or any combination thereof. When implemented in software, firmware, middleware or microcode, the program code or code segments to perform the necessary tasks may be stored in a machine readable medium such as a separate storage(s) not shown. A processor may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

I claim:

1. A method of managing Non-Sticky Assignments by an access terminal in a wireless communication system, comprising:
   receiving at least one Non-Sticky Forward Link Assignment block with at least one of a broadcast or a unicast media access identifier matched with a media access identifier of the access terminal;
   determining a value of a FLImplicitDeassignEnabled field based on the Non-Sticky Forward Link Assignment block;
   determining, by the access terminal, whether a TunedAway indication has been received from Connected State Protocol by the access terminal; and
   managing the Non-Sticky Forward Link Assignment block in response to results of said determining the value of the FLImplicitDeassignEnabled field and said determining whether the TunedAway indication has been received.

2. The method of claim 1, further comprising, determining that the TunedAway indication has not been received, and in response to the FLImplicitDeassignEnabled field having a value of '1' and the TunedAway indication not being received, temporarily maintaining the at least one Non-Sticky Forward Link Assignment block for an interlace for a duration specified in the at least one Non-Sticky Forward Link Assignment block, and assigning a set of hop-ports for the interlace.

3. The method of claim 1, further comprising, in response to the FLImplicitDeassignEnabled field having a value of '1' and the TunedAway indication being received by an access terminal, expiring the at least one Non-Sticky Forward Link Assignment block at the access terminal.

4. The method of claim 1, further comprising, determining a value of an Extended Transmission field.

5. The method of claim 4, further comprising, in response to the Extended Transmission field being set to '1' determining a value of a SelectedInterlace mode.

6. A method of managing Non-Sticky Assignments by an access terminal in a wireless communication system, comprising:
   receiving at least one Non-Sticky Forward Link Assignment block with at least one of a broadcast or a unicast media access identifier matched with a media access identifier of the access terminal;
   determining a value of a FLImplicitDeassignEnabled field based on the Non-Sticky Forward Link Assignment block;
   determining whether a TunedAway indication has been received from Connected State Protocol by the access terminal;
   determining a value of an Extended Transmission field of the at least one Non-Sticky Forward Link Assignment block;
   in response to the Extended Transmission field being set to '1', determining a value of a SelectedInterlace mode; and
   in response to the SelectedInterlace mode being equal to '1' and the Extended Transmission field being set to '1', ignoring the at least one Non-Sticky Forward Link Assignment block.

7. A method of managing Non-Sticky Assignments by an access terminal in a wireless communication system, comprising:
   receiving at least one Non-Sticky Forward Link Assignment block with at least one of a broadcast or a unicast media access identifier matched with a media access identifier of the access terminal;
   determining a value of a FLImplicitDeassignEnabled field based on the Non-Sticky Forward Link Assignment block;
   determining whether a TunedAway indication has been received from Connected State Protocol by the access terminal;
   determining a value of an Extended Transmission field of the at least one Non-Sticky Forward Link Assignment block;
   in response to the Extended Transmission field being set to '1', determining a value of a SelectedInterlace mode; and in response to the Extended Transmission field being equal to '0', assigning hop ports for an interlace consisting of a set of standard physical layer frames by the at least one Non-Sticky Forward Link Assignment block.

8. A method of managing Non-Sticky Assignments by an access terminal in a wireless communication system, comprising:
   receiving at least one Non-Sticky Forward Link Assignment block with at least one of a broadcast or a unicast media access identifier matched with a media access identifier of the access terminal;
   determining a value of a FLImplicitDeassignEnabled field based on the Non-Sticky Forward Link Assignment block;
   determining whether a TunedAway indication has been received from Connected State Protocol by the access terminal;
   determining a value of an Extended Transmission field of the at least one Non-Sticky Forward Link Assignment block;
   in response to the Extended Transmission field being set to '1', determining a value of a SelectedInterlace mode; and
   in response to the Extended Transmission field being equal to '1' and the SelectedInterlace mode being set to '0', assigning a quantity of hop ports, for an interlace consisting of a set of extended physical layer frames, specified in the duration field of the at least one Non-Sticky Forward Link Assignment block.

9. A method of managing Non-Sticky Assignments by an access terminal in a wireless communication system, comprising:
   receiving at least one Non-Sticky Forward Link Assignment block with at least one of a broadcast or a unicast media access identifier matched with a media access identifier of the access terminal;
   determining a value of a FLImplicitDeassignEnabled field based on the Non-Sticky Forward Link Assignment block;
   determining whether a TunedAway indication has been received from Connected State Protocol by the access terminal; and
   determining a multi carrier mode, and in response to multi carrier mode being set to MultiCarrierOn, maintaining the at least one Non-Sticky Forward Link Assignment block for an active carrier by the access terminal.

10. A non-transitory computer-readable storage medium comprising executable instructions that, in response to execution, cause a computing system to perform operations, comprising:
    receiving at least one Non-Sticky Forward Link Assignment Block having at least one of a broadcast or a unicast media access control identifier matched with a media access control identifier of an access terminal;
    determining a value of a FLImplicitDeassignEnabled field based on the at least one Non-Sticky Forward Link Assignment block;
    determining, by the access terminal, whether a TunedAway indication has been received from Connected State Protocol by the access terminal; and
    managing the Non-Sticky Forward Link Assignment block in response to results of said determining the value of the FLImplicitDeassignEnabled field and said determining whether the TunedAway indication has been received.

11. An apparatus operable in a wireless communication system, the apparatus comprising:
    means for receiving at least one Non-Sticky Forward Link Assignment Block having at least one of a broadcast or a unicast media access control identifier matched with media access control identifier of an access terminal;
    means for determining a value of a FLImplicitDeassignEnabled field based on the at least one Non-Sticky Forward Link Assignment block;
    means for determining, by the access terminal, that a TunedAway indication has been received from Connected State Protocol by the access terminal; and
    means for managing the Non-Sticky Forward Link Assignment block in response to results of said determining the value of the FLImplicitDeassignEnabled field and said determining whether the TunedAway indication has been received.

12. The apparatus of claim 11, further comprises means for determining that the TunedAway indication has not been received, and in response to the FLImplicitDeassignEnabled field having a value of '1' and the TunedAway indication not being received by the access terminal, means for temporarily maintaining the at least one Non-Sticky Forward Link Assignment block for an interlace for a duration specified in the at least one Non-Sticky Forward Link Assignment block, and means for assigning a set of hop-ports for the interlace.

13. The apparatus of claim 11, further comprising means for expiring the at least one Non-Sticky Forward Link Assignment block at an access terminal in response to the FLImplicitDeassignEnabled field having a value of '1' and the TunedAway indication being received.

14. The apparatus of claim 11, further comprising means for determining a value of an Extended Transmission field.

15. The apparatus of claim 14, further comprising means for determining a value of a SelectedInterlace mode in response to the Extended Transmission field being set to '1'.

16. An apparatus operable in a wireless communication system, the apparatus comprising:
    means for receiving at least one Non-Sticky Forward Link Assignment Block having at least one of a broadcast or a unicast media access control identifier matched with media access control identifier of an access terminal;
    means for determining a value of a FLImplicitDeassignEnabled field based on the at least one Non-Sticky Forward Link Assignment block;
    means for determining whether a TunedAway indication has been received from Connected State Protocol by the access terminal;
    means for determining a value of an Extended Transmission field of the at least one Non-Sticky Forward Link Assignment Block;
    means for determining a value of a SelectedInterlace mode in response to the Extended Transmission field being set to '1'; and
    means for ignoring the at least one Non-Sticky Forward Link Assignment block in response to the Extended Transmission field being set to '1' and the SelectedInterlace mode equaling '1'.

17. An apparatus operable in a wireless communication system, the apparatus comprising:
    means for receiving at least one Non-Sticky Forward Link Assignment Block having at least one of a broadcast or a unicast media access control identifier matched with media access control identifier of an access terminal;
    means for determining a value of a FLImplicitDeassignEnabled field based on the at least one Non-Sticky Forward Link Assignment block;

means for determining whether a TunedAway indication has been received from Connected State Protocol by the access terminal;

means for determining a value of an Extended Transmission field of the at least one Non-Sticky Forward Link Assignment Block;

means for determining a value of a SelectedInterlace mode in response to the Extended Transmission field being set to '1'; and means for assigning a set of hop ports for an interlace consisting of a set of standard physical layer frames by the at least one Non-Sticky Forward Link Assignment block in response to the Extended Transmission field equaling '0'.

18. An apparatus operable in a wireless communication system, the apparatus comprising:

means for receiving at least one Non-Sticky Forward Link Assignment Block having at least one of a broadcast or a unicast media access control identifier matched with media access control identifier of an access terminal;

means for determining a value of a FLImplicitDeassignEnabled field based on the at least one Non-Sticky Forward Link Assignment block;

means for determining whether a TunedAway indication has been received from Connected State Protocol by the access terminal;

means for determining a value of an Extended Transmission field of the at least one Non-Sticky Forward Link Assignment Block;

means for determining a value of a SelectedInterlace mode in response to the Extended Transmission field being set to '1'; and means for assigning, in response to the Extended Transmission field being equal to '1' and the SelectedInterlace mode being set to '0', a set of hop ports for an interlace consisting of a set of extended physical layer frames based on a number of extended physical layer frames specified in a duration field of the at least one Non-Sticky Forward Link Assignment Block.

19. An apparatus operable in a wireless communication system, the apparatus comprising:

means for receiving at least one Non-Sticky Forward Link Assignment Block having at least one of a broadcast or a unicast media access control identifier matched with media access control identifier of an access terminal;

means for determining a value of a FLImplicitDeassignEnabled field based on the at least one Non-Sticky Forward Link Assignment block;

means for determining whether a TunedAway indication has been received from Connected State Protocol by the access terminal; and means for determining a multi carrier mode, and means for maintaining, in response to the multi carrier mode being set to MultiCarrierOn, the at least one Non-Sticky Forward Link Assignment block for an active carrier by the access terminal.

20. A wireless communication apparatus, comprising:
a storage device;
at least one processor coupled to the storage device, the at least one processor configured to:
receive at least one Non-Sticky Forward Link Assignment block with at least one of a broadcast or a unicast media access identifier matched with a media access identifier of an access terminal;
determine a value of a FLImplicitDeassignEnabled field based on the Non-Sticky Forward Link Assignment block;

determine, by the access terminal, that a TunedAway indication has been received from Connected State Protocol by the access terminal; and
manage the Non-Sticky Forward Link Assignment block in response to results of said determining the value of the FLImplicitDeassignEnabled field and said determining whether the TunedAway indication has been received.

21. The wireless communication apparatus of claim 20, wherein the at least one processor is further configured to determine that the TunedAway indication has not been received, and in response to the FLImplicitDeassignEnabled field having a value of '1' and the TunedAway indication not being received, temporarily maintain the at least one Non-Sticky Forward Link Assignment block for an interlace for a duration specified in the at least one Non-Sticky Forward Link Assignment block, and assign a set of hop-ports for the interlace.

22. The wireless communication apparatus of claim 20, wherein the at least one processor is further configured to expire the at least one Non-Sticky Forward Link Assignment block at the access terminal in response to the FLImplicitDeassignEnabled field having a value of '1' and the TunedAway indication being received by an access terminal.

23. The wireless communication apparatus of claim 20, wherein the at least one processor is further configured to determine a value of an Extended Transmission field.

24. The wireless communication apparatus of claim 23, wherein the at least one processor is further configured to determine a value of a SelectedInterlace mode in response to the Extended Transmission field being set to '1'.

25. A wireless communication apparatus, comprising:
a storage device;
at least one processor coupled to the storage device, the at least one processor configured to:
receive at least one Non-Sticky Forward Link Assignment block with at least one of a broadcast or a unicast media access identifier matched with a media access identifier of an access terminal;
determine a value of a FLImplicitDeassignEnabled field based on the Non-Sticky Forward Link Assignment block;
determine whether a TunedAway indication has been received from Connected State Protocol by the access terminal;
determine a value of an Extended Transmission field of the at least one Non-Sticky Forward Link Assignment block;
determine a value of a SelectedInterlace mode in response to the Extended Transmission field being set to '1'; and
ignore the at least one Non-Sticky Forward Link Assignment block in response to the SelectedInterlace mode being equal to '1' and the Extended Transmission field being set to '1'.

26. A wireless communication apparatus, comprising:
a storage device;
at least one processor coupled to the storage device, the at least one processor configured to:
receive at least one Non-Sticky Forward Link Assignment block with at least one of a broadcast or a unicast media access identifier matched with a media access identifier of an access terminal;
determine a value of a FLImplicitDeassignEnabled field based on the Non-Sticky Forward Link Assignment block;
determine whether a TunedAway indication has been received from Connected State Protocol by the access terminal;

determine a value of an Extended Transmission field of the at least one Non-Sticky Forward Link Assignment block;

determine a value of a SelectedInterlace mode in response to the Extended Transmission field being set to '1'; and assign hop ports for an interlace consisting of a set of standard physical layer frames by the at least one Non-Sticky Forward Link Assignment block in response to the Extended Transmission field being equal to '0'.

27. A wireless communication apparatus, comprising:

a storage device;

at least one processor coupled to the storage device, the at least one processor configured to:

receive at least one Non-Sticky Forward Link Assignment block with at least one of a broadcast or a unicast media access identifier matched with a media access identifier of an access terminal;

determine a value of a FLImplicitDeassignEnabled field based on the Non-Sticky Forward Link Assignment block;

determine whether a TunedAway indication has been received from Connected State Protocol by the access terminal;

determine a value of an Extended Transmission field of the at least one Non-Sticky Forward Link Assignment block;

determine a value of a SelectedInterlace mode in response to the Extended Transmission field being set to '1'; and assign a quantity of hop ports, for an interlace consisting of a set of extended physical layer frames, specified in the duration field of the at least one Non-Sticky Forward Link Assignment block, in response to the extended transmission field being equal to '1' and SelectedInterlace mode being set to '0'.

28. A wireless communication apparatus, comprising:

a storage device;

at least one processor coupled to the storage device, the at least one processor configured to:

receive at least one Non-Sticky Forward Link Assignment block with at least one of a broadcast or a unicast media access identifier matched with a media access identifier of an access terminal;

determine a value of a FLImplicitDeassignEnabled field based on the Non-Sticky Forward Link Assignment block;

determine whether a TunedAway indication has been received from Connected State Protocol by the access terminal; and determine a multi carrier mode, and maintain the at least one Non-Sticky Forward Link Assignment block for an active carrier by the access terminal, in response to multi carrier mode being equal to MultiCarrierOn.

\* \* \* \* \*